United States Patent
Gayrard et al.

(10) Patent No.: US 9,252,869 B2
(45) Date of Patent: Feb. 2, 2016

(54) SATELLITE TELECOMMUNICATIONS SYSTEM FOR PROVIDING STAR TRAFFIC AND MESH TRAFFIC

(71) Applicant: THALES, Neuilly-sur-Seine (FR)

(72) Inventors: Jean-Didier Gayrard, Cugnaux (FR); Didier Le Boulc'h, Toulouse (FR); Eric Melet, Toulouse (FR)

(73) Assignee: Thales, Courbevoie (FR)

( * ) Notice: Subject to any disclaimer, the term of this patent is extended or adjusted under 35 U.S.C. 154(b) by 375 days.

(21) Appl. No.: 14/056,782

(22) Filed: Oct. 17, 2013

(65) Prior Publication Data

US 2014/0112241 A1 Apr. 24, 2014

(30) Foreign Application Priority Data

Oct. 18, 2012 (FR) .................................... 12 02783

(51) Int. Cl.
*H04B 7/185* (2006.01)
*H04J 1/10* (2006.01)
*H04B 7/204* (2006.01)

(52) U.S. Cl.
CPC .......... *H04B 7/18543* (2013.01); *H04B 7/2041* (2013.01); *H04J 1/10* (2013.01); *H04Q 7/20* (2013.01)

(58) Field of Classification Search
None
See application file for complete search history.

(56) References Cited

U.S. PATENT DOCUMENTS

| | | | | |
|---|---|---|---|---|
| 5,287,543 A * | 2/1994 | Wolkstein | ............ | H04B 7/2045 330/124 R |
| 6,463,279 B1 * | 10/2002 | Sherman | ............ | H04B 7/18539 455/12.1 |
| 6,522,864 B1 * | 2/2003 | Febvre | ................. | H04B 7/2041 455/12.1 |
| 6,600,921 B1 * | 7/2003 | Pietrusiak | .............. | H01Q 1/288 244/158.4 |
| 6,625,129 B1 * | 9/2003 | Olds | ................... | H04B 7/18567 370/316 |
| 6,704,543 B1 * | 3/2004 | Sharon | ............... | H04B 7/18584 455/12.1 |
| 8,265,549 B2 * | 9/2012 | Karabinis | ............ | H04B 7/0408 342/357.23 |
| 8,634,296 B2 * | 1/2014 | Agarwal | ............ | H04B 7/18515 370/230 |
| 8,805,275 B2 * | 8/2014 | O'Neill | .............. | H04B 7/18515 370/316 |

(Continued)

FOREIGN PATENT DOCUMENTS

| | | |
|---|---|---|
| WO | 95/28015 A1 | 10/1995 |
| WO | 01/97408 A2 | 6/2001 |
| WO | 2008/115949 A2 | 3/2008 |

*Primary Examiner* — Jeffrey M Rutkowski
*Assistant Examiner* — Jonathan B Wood
(74) *Attorney, Agent, or Firm* — Baker & Hostetler LLP

(57) ABSTRACT

A satellite telecommunications system has a global coverage area and a plurality of user terminals distributed in the global coverage area. The global coverage area is covered by a first set of spots which form a regular cellular mesh, and by at least a second set of local spots, irregularly distributed and superimposed geographically on spots of the first set. The spots of the first set of spots have allocated channels with the same frequency capacity, the same channel being re-used by a plurality of different spots, and the local spots of the second set of spots have a special allocated channel having an increased frequency capacity.

11 Claims, 10 Drawing Sheets

(56) References Cited

U.S. PATENT DOCUMENTS

| | | | |
|---|---|---|---|
| 8,909,220 B1 * | 12/2014 | Aftahi | H04B 7/2041 370/316 |
| 2002/0039883 A1 * | 4/2002 | Zaghloul | H04B 7/2041 455/13.3 |
| 2002/0041575 A1 * | 4/2002 | Karabinis | H04B 7/18539 370/319 |
| 2004/0092257 A1 * | 5/2004 | Chung | H04B 7/2041 455/429 |
| 2006/0205347 A1 | 9/2006 | Karabinis | |
| 2006/0211419 A1 * | 9/2006 | Karabinis | H04B 7/2041 455/427 |
| 2007/0082609 A1 * | 4/2007 | Kiesling | H04B 7/2041 455/12.1 |
| 2007/0155319 A1 * | 7/2007 | Monte | H04B 7/1853 455/12.1 |
| 2007/0178833 A1 * | 8/2007 | Wahlberg | H04B 7/195 455/12.1 |
| 2008/0146145 A1 * | 6/2008 | Pateros | H04B 7/1858 455/12.1 |
| 2008/0252514 A1 * | 10/2008 | Rigal | H04H 20/74 342/352 |
| 2009/0290534 A1 * | 11/2009 | Connors | H04B 7/18582 370/319 |
| 2009/0295628 A1 * | 12/2009 | Wilson | H04B 7/2041 342/356 |
| 2010/0141543 A1 * | 6/2010 | Parekh | H01Q 19/19 343/786 |
| 2010/0303002 A1 * | 12/2010 | Zorba Barah | H04B 7/18534 370/316 |
| 2011/0126229 A1 * | 5/2011 | Littlejohn | H04H 60/25 725/35 |
| 2011/0167313 A1 * | 7/2011 | Miller | H04B 7/18582 714/752 |
| 2011/0189948 A1 * | 8/2011 | Miller | H04B 7/2041 455/13.4 |
| 2012/0034915 A1 * | 2/2012 | Arcidiacono | H04B 7/18513 455/430 |
| 2012/0075150 A1 * | 3/2012 | Raguenet | H01Q 25/007 343/711 |
| 2012/0207106 A1 * | 8/2012 | Banerjea | H04W 72/0453 370/329 |
| 2013/0148570 A1 * | 6/2013 | Miller | H04W 88/04 370/316 |
| 2013/0154874 A1 * | 6/2013 | Burr | H01Q 25/007 342/188 |
| 2013/0242856 A1 * | 9/2013 | Foxworthy | H04B 7/18541 370/316 |
| 2014/0045420 A1 * | 2/2014 | Tong | H04B 7/18506 455/12.1 |

\* cited by examiner

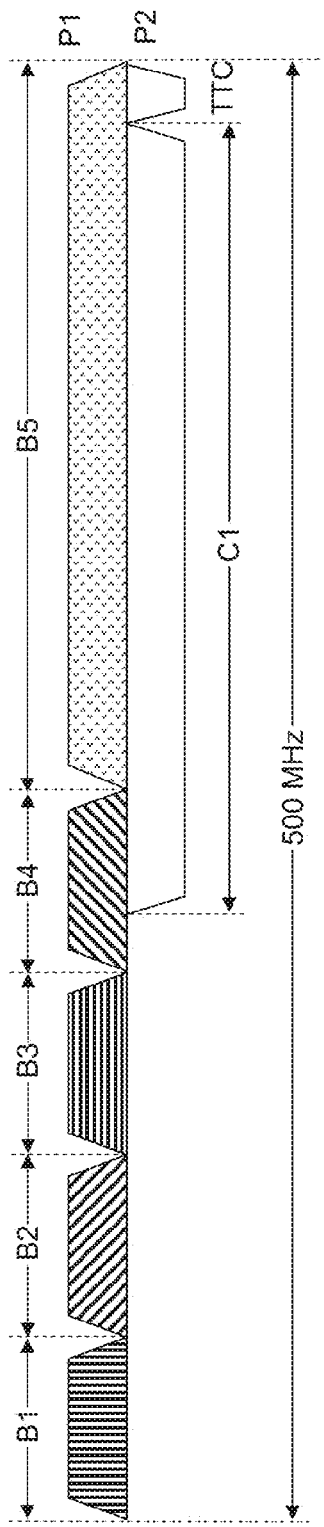
FIG.3b
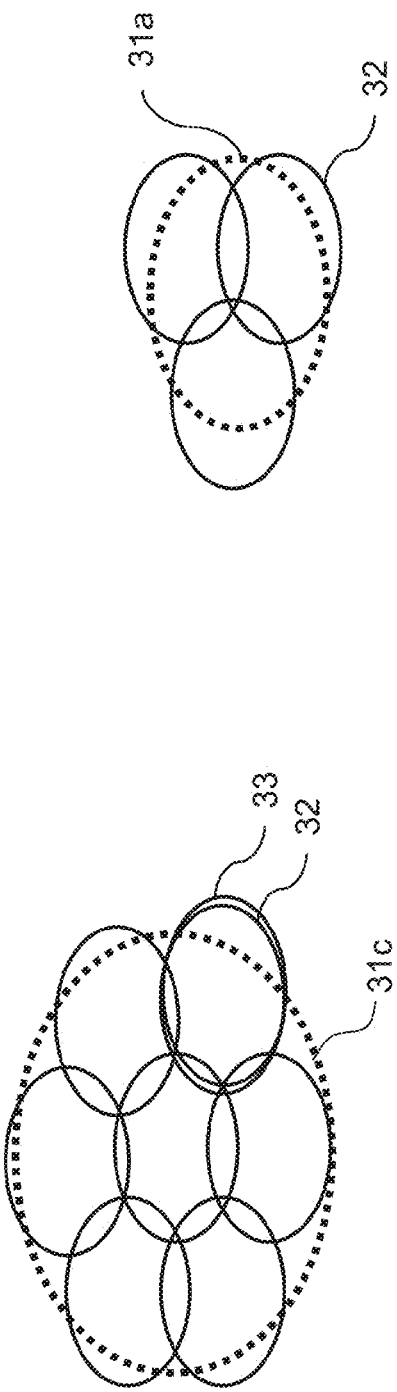
FIG.3d
FIG.3c

SATELLITE TELECOMMUNICATIONS SYSTEM FOR PROVIDING STAR TRAFFIC AND MESH TRAFFIC

CROSS-REFERENCE TO RELATED APPLICATION

This application claims priority to foreign French patent application No. FR 1202783, filed on Oct. 18, 2012, the disclosure of which is incorporated by reference in its entirety.

FIELD OF THE INVENTION

The present invention relates to a satellite telecommunications system for providing star traffic and mesh traffic. It can be used, notably, in the field of satellite telecommunications, for covering a global coverage area and coverage areas of theatres of operation, for example in the context of military or governmental applications, and can serve both fixed and mobile user terminals.

BACKGROUND

In a known way, a satellite telecommunications system intended to provide a service to fixed and mobile terminals includes, as shown in FIG. 1 for example, a geostationary satellite 10, at least one terrestrial gateway 23 located in a chosen metropolitan coverage area 21, for example a country, illuminated by a beam from a first transmitting and receiving antenna 70 located on board the satellite 10, and a set of user terminals 35 distributed in a service area, for example a side of the Earth visible from the satellite 10. The service area includes a global coverage area 30 and a plurality of theatre of operation coverage areas 31a, 31b, 31c of different shapes and sizes, located in different positions in the global coverage area 30, wherein the theatre coverage areas may be very extensive and may relate to a region, such as the regional area 31c. These different coverage areas, namely the global coverage areas 30 and theatre coverage areas 31a, 31b, 31c, are illuminated by a second antenna system 60 of the satellite 10, which generates a beam covering the global coverage area and an additional beam for each theatre coverage area. Thus, in the example of FIG. 1, the antenna system 60 generates four different beams covering, respectively, the global coverage area 30 and the three theatre coverage areas 31a, 31b, 31c. The set of terminals includes fixed terminals, transportable terminals and mobile terminals, for example land vehicles, ships and aircraft, which are located in the global coverage area and in the theatre coverage areas of the service area, at different positions, on land, at sea and in the air respectively. The gateway 23 communicates with the satellite 10 via a first bidirectional radio link 22, and the user terminals 35 communicate with the satellite 10 via second bidirectional radio links 36. The satellite serves to connect the gateway 23 to the user terminals 35, and to connect the user terminals to each other, by means of radio signals. The traffic between the gateway 23 and the user terminals 23 located in the global and theatre coverage areas is called "star traffic", while the traffic between two user terminals is called "mesh traffic". Mesh traffic is inter-spot traffic when it relates to communications between two terminals located in two different coverage areas, whereas mesh traffic is intra-spot (or "loopback") traffic when it relates to communications between two terminals located in the same coverage area. The theatre coverage areas are geographical areas in which operations take place and where the active terminals are concentrated. These theatre coverage areas can be positioned anywhere within the global coverage area 30 and are of different types, according to their surface area. In the example of FIG. 1, the theatre coverage areas are of three different sizes on the ground, corresponding, respectively, to a narrow spot 31b which may, for example, be 600 km in diameter at the nadir; a theatre spot 31a which may, for example, be 2000 km in diameter at the nadir; and a regional spot 31c which may, for example, be 4000 km in diameter at the nadir. Different frequency channels are allocated to each theatre coverage area 31a, 31b, 31c and to the global coverage area 30. If the links 22 between the gateway 23 and the satellite 10 are in band X, the frequency plan must include another frequency channel allocated to the metropolitan coverage area 21 of the gateway 23.

These known telecommunications systems have a number of drawbacks. A first drawback is the low, or non-existent, rate of frequency re-use. This is because options for re-using the same frequency bands or channels in a number of different coverage areas to increase the total bandwidth capacity of the system are structurally limited or unavailable. On the one hand, the frequency band allocated to the global coverage area 30 cannot be re-used in theatre coverage areas 31a, 31b, 31c or in the metropolitan coverage area 21; on the other hand, the possibility of re-using the same frequency band between two theatre coverage areas depends on the distance between the two coverage areas and the isolation performance between the two corresponding beams generated by the antenna system 60 of the satellite 10. The theatre coverage areas may be located in any positions, are variable in time, and are difficult to predict, because they are dependent on the world geopolitical context, natural disasters, and other factors; consequently there are always cases of operation in which it is impossible to re-use the frequency channels between two different coverage areas. Thus the guaranteed total bandwidth of a telecommunications system for military or governmental use according to the prior art is limited to the total band allocated to the system, for example 500 MHz in the X band between 7 and 8 GHz, and the bandwidth of the frequency channels allocated to the global and theatre coverage areas is also limited, as is the performance of any anti-jamming device based on spread spectrum, direct sequence spread spectrum or frequency hopping spread spectrum techniques in the coverage areas.

A second drawback is the poor intrinsic gain performance of the antenna system of the satellite in the global coverage area and in extensive theatre coverage areas such as regional spots. Thus, regardless of the techniques used to design the satellite antennas, which may be direct radiation active antennas, mechanical reflector antennas, or other types, the gain of the antennas in the global coverage area reaches a ceiling of less than 18 dB at the edge of coverage, while in a theatre coverage area with a diameter of 3000 km the antenna gain reaches a ceiling of less than 30 dB at the edge of coverage. These constraints on the gain performance of the satellite antennas result in a considerable variation of the radio frequency performance of the satellite between one type of coverage and another, and therefore a considerable variation of the quality of the links between the coverage areas for any given type of user terminal. In particular, the very poor performance of the satellite in terms of sensitivity in the global or regional coverage areas limits the available bit rate in the uplink, from the terminal towards the satellite, for small mobile or transportable terminals whose radio frequency performance is limited. Furthermore, the establishment of links from the satellite towards these small fixed or mobile terminals requires a large radio frequency capacity for the payload of the satellite, thus imposing operational limits on the number of links established and on the bit rate of each link.

These drawbacks lead to either a specialization of the terminals according to the coverage area, in which case the performance of the terminal, typically in terms of the antenna diameter, is specified according to the coverage area in which the terminal is to operate, or the overdesign of all the terminals, to enable them to communicate in any type of coverage area. Furthermore, these various drawbacks restrict the possibilities of increasing the total capacity of the telecommunications system in terms of the total bit rate and the number of simultaneously active terminals.

SUMMARY OF THE INVENTION

The object of the invention is to provide a satellite telecommunications system which can provide star traffic and mesh traffic without the drawbacks of the existing system, thereby making it possible to achieve a constant high rate of frequency re-use, to provide a uniform high gain of the satellite antenna, regardless of the surface area and the type (global or regional) of the coverage areas, and to temporarily increase, on request, the bandwidth and radio frequency capacity resources of the satellite in geographical areas which can be selected and repositioned according to requirements.

To this end, the invention relates to a satellite telecommunications system for providing star traffic and mesh traffic, including a satellite, at least one terrestrial gateway located in a metropolitan area, a global coverage area with a plurality of fixed or mobile user terminals distributed in the global coverage area, a bidirectional radio link between the gateway and the satellite, bidirectional radio links between the satellite and the user terminals, and a telemetry and command communications link between the gateway and the satellite. The global coverage area is covered by a first set of spots of identical size, which partially overlap and form a regular cellular mesh, and at least a second set of local spots, irregularly distributed in the global coverage area, and superimposed geographically on spots of the first set. The spots of the first set have first allocated frequency bands corresponding to N different channels having the same frequency capacity, where N is an integer greater than 1, said first frequency bands being re-used for different spots of the first set spaced apart from each other, while the local spots of the second set have a second allocated frequency band corresponding to a special channel having an increased frequency capacity, greater than the frequency capacity of the channels of the spots of the first set, the special channel of the second set of spots being different from the channels of the first set of spots.

The global coverage area may also be covered by a third set of local spots, irregularly distributed in the global coverage area, and geographically superimposed on spots of the first set, the local spots of the third set having a third allocated frequency band corresponding to a special additional channel having an increased frequency capacity, greater than the frequency capacity of the channels of the spots of the first set, the special additional channel of the third set of local spots being different from the channels allocated to the spots of the first set and from the special channel allocated to the spots of the second set of local spots.

Advantageously, the satellite includes a first multi-beam transmitting and receiving antenna system which, on the one hand, illuminates the whole of the global coverage area and forms, on the ground, the regular cellular network of spots of the first set of spots, and which, on the other hand, locally illuminates geographical areas of the global coverage where user terminals are concentrated, by the irregularly distributed local spots of the second set of spots, the geographical areas illuminated by the local spots of the second set of spots being selected and activated by the gateway.

Advantageously, the satellite further comprises at least one digital transparent processor intended to filter and route the intra-spot and inter-spot mesh traffic between user terminals located in the same spot or in two different spots and the star traffic between terminals located in the global coverage area and the gateway located in the metropolitan coverage area, the digital transparent processor including input ports connected to the first multi-beam transmitting and receiving antenna system by a set of reception circuits and output ports connected to the first multi-beam transmitting and receiving antenna system by a set of transmission circuits, each reception circuit including a frequency multiplexer for the frequency multiplexing and selection of different channels appearing at the same input of the digital transparent processor and each transmission circuit including a frequency demultiplexer for the demultiplexing and selection of different channels delivered from the same output of the digital transparent processor.

Advantageously, the set of reception circuits further includes low-noise amplifiers, each equipped with a power limiter.

Advantageously, the set of transmission circuits further includes multiport power amplifiers for the combined multiport amplification of the radio signals intended for user terminals located in a plurality of different spots.

Preferably, the frequency multiplexer of each reception circuit includes N couplers and a switch having four different settings, the setting of each switch being controlled by the gateway, and each switch selecting a different channel chosen from among all the channels allocated to the spots of the first set of spots and from among all the combinations of channels which couple the special channel allocated to the second set of spots to one of said channels allocated to the spots of the first set, the channel selected by each switch depending on the setting of the corresponding switch.

Advantageously, the satellite may include at least a first digital transparent processor intended to filter and route the traffic corresponding to the spots of the first set of spots and at least a second processor intended to filter and route the traffic corresponding to the local spots of the second set of spots.

BRIEF DESCRIPTION OF THE DRAWINGS

Other specific features and advantages of the invention will be clearly understood from the remainder of the description, which is given by way of purely illustrative and non-limiting example, with reference to the appended schematic drawings, of which:

FIG. 3b shows a diagram of an example of allocation of frequency sub-bands to the multiple beams generated by the system of FIG. 3a, according to the invention;

FIGS. 3c and 3d show two diagrams of two examples of spot configuration for providing, respectively, theatre coverage including a local spot with increased capacity and theatre coverage including only spots with normal capacity, according to the invention;

DETAILED DESCRIPTION

Figure 1:
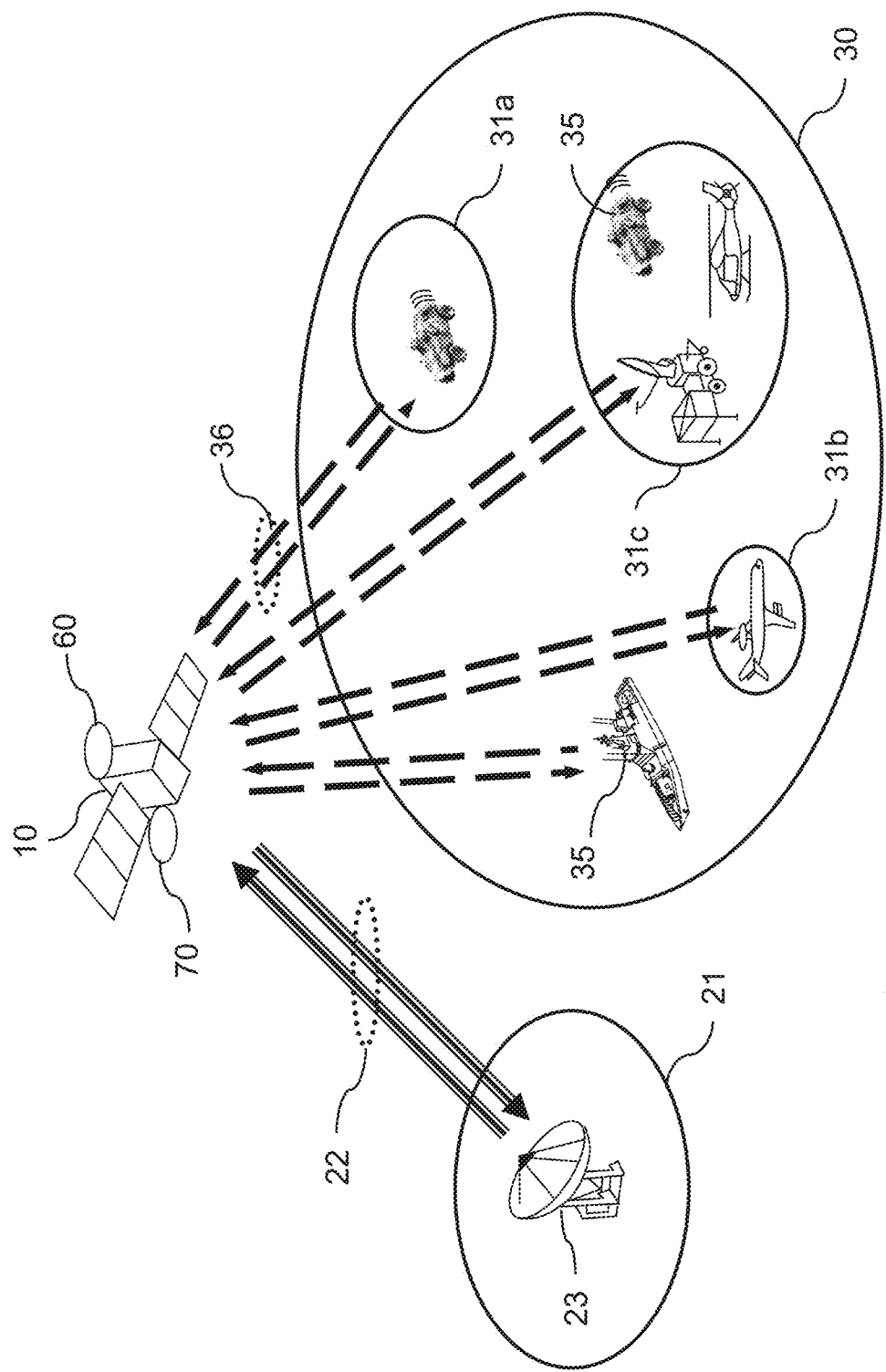
FIG. 1 shows a diagram of an example of a satellite telecommunications system according to the prior art.
Figure 2:
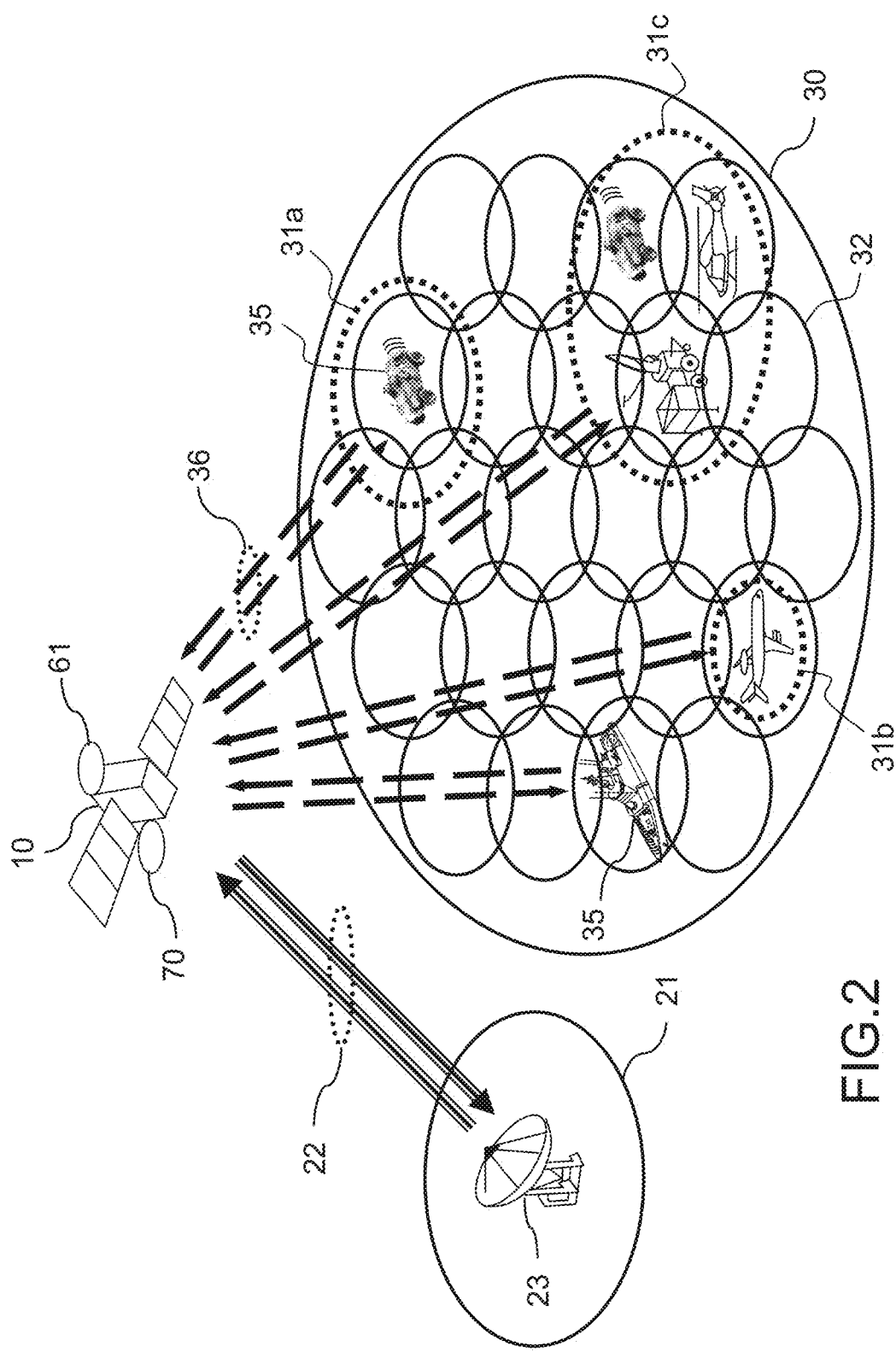
FIG. 2 shows a diagram of an example of a satellite telecommunications system with multi-beam global coverage, according to the invention.

As shown in the example of FIG. 2, the satellite telecommunications system according to the invention includes a geostationary satellite 10, one or more terrestrial gateways 23 located in a metropolitan geographical coverage area 21, and a population of fixed, transportable or mobile user terminals 35, distributed in a global geographical coverage area 30 and more or less concentrated in geographic coverage areas of theatres of operation 31a, 31b, 31c shown in dotted lines. The station coverage area may be located inside or outside the global coverage area. The gateway 23 communicates with the satellite 10 by means of station radio signals 22, and the user terminals 35 communicate with the satellite 10 by means of bidirectional user radio signals 36. The user radio signals 36 can use, for example, the X band or other frequency bands. Similarly, the station radio signals 22 can use, for example, the X band, the Ka band, the Q band, or another frequency band. Telemetry and command radio signals TTC are also exchanged between the gateway 23 and the satellite 10.

The satellite 10 includes a first multi-beam transmission and reception antenna system 61 which generates a first set of multiple beams illuminating the whole of the global coverage area 30 and forming, on the ground, a regular network of spots 32 covering the global coverage area, and at least a second set of beams illuminating only certain selected local geographical regions of the global coverage area 30 and forming, on the ground, a second set of local spots 33. The local spots 33 of the second set of spots coincide with, or are geographically superimposed on, some of the spots 32 of the first set, as shown for example in FIG. 3c. The spots 32 of the first set form a two-dimensional cellular network of the global coverage area, two adjacent spots being capable of partially overlapping each other in such a way that there is no gap in coverage. The local spots 33 of the second set are irregularly distributed in different geographical regions of the global coverage area, selected in accordance with the traffic requirements and repositionable on request according to the command orders transmitted by the gateway 23. The satellite also includes a second transmission and reception antenna system 70 which generates a single beam, corresponding to a single spot, covering the metropolitan coverage area 21. The superimposition of two spots 32, 33 of the first and second sets of spots enables the satellite capacity to be increased locally in geographical areas where user terminals 35 are concentrated and where there is a large amount of traffic. The local spots 33 of the second set of spots may be moved as desired and may be positioned at any geographical location of the global coverage area, on any pre-existing spot 32 of the first set of spots.

Figure 3A:
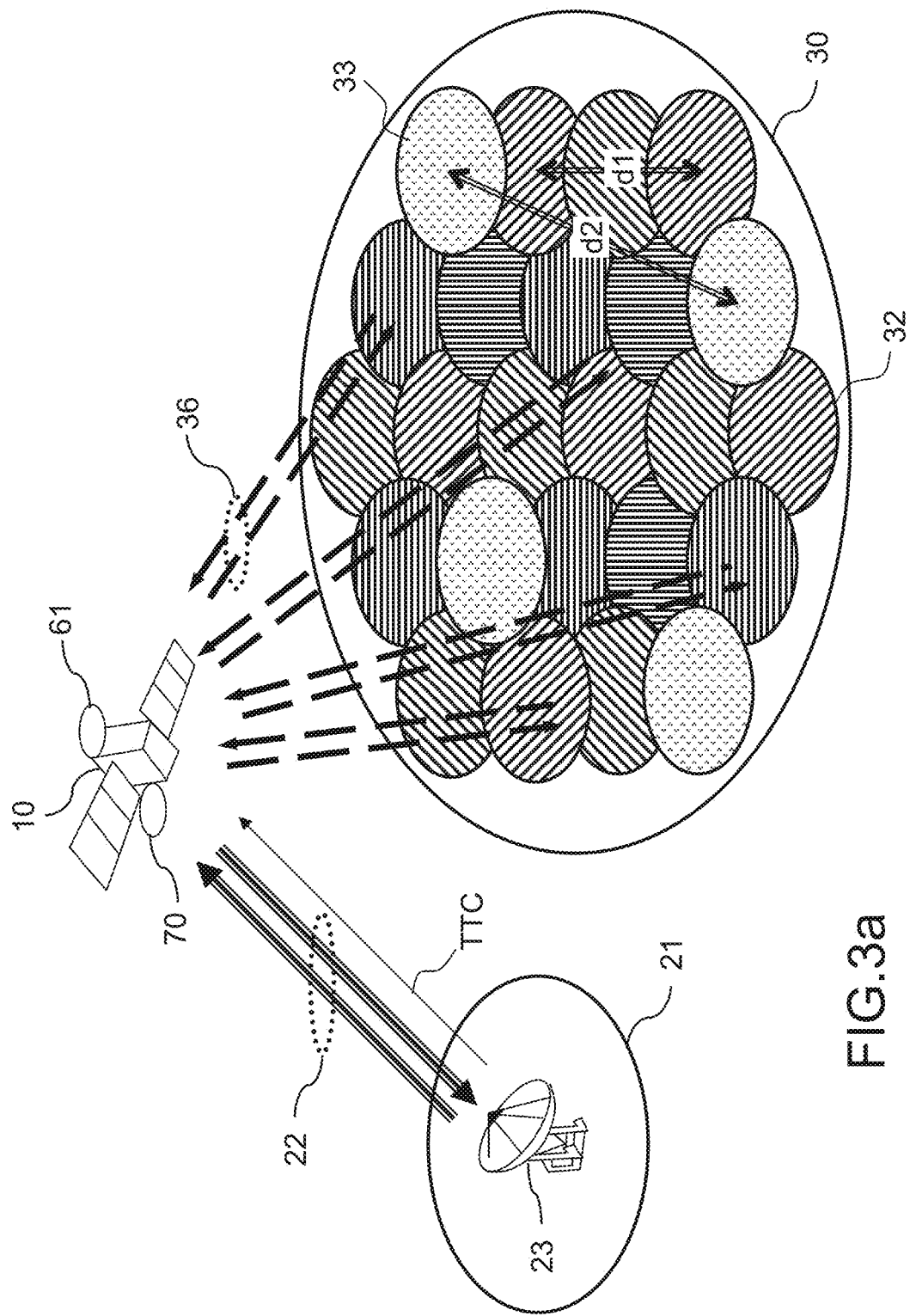
FIG. 3a shows a diagram of an example of a satellite telecommunications system with multi-beam global coverage and with frequency re-use in the case where five different colours are used, according to the invention.

FIGS. 3a and 3b show a first example of allocation of frequency sub-bands to the spots generated by the system of FIG. 2a, in the case where five different channels are used. The total frequency band allocated to the satellite telecommunications system, for example 500 MHz in the X band, may be divided into a plurality of different sub-bands, for example five sub-bands having different frequencies, also called colours or channels, B1, B2, B3, B4, B5, operating, for example, in a first polarization state P1. In FIG. 2a, the four channels B1 to B4 have the same frequency bandwidth and the channel B5 has a width greater than that of the four channels B1 to B4. The N channels B1 to B4, where N is an integer greater than 1, have the same frequency bandwidth, and are allocated to the spots 32 of the first set of spots. The channel B5, called the special channel with an increased frequency capacity, is allocated to the local spots 33 of the second set of spots. The allocation of the N channels B1 to B4 to the spots 32 of the first set of spots makes use of a well-known technique of frequency re-use for cellular coverage. Each channel B1 to B4 is allocated to a subset of spots 32 of the first set of spots, the same channel being allocated to a plurality of different spots 32 which are sufficiently distant from each other to allow the same frequency band to be re-used. For example, in FIG. 3a, 24 different spots are formed in the global coverage area 30, and each channel B1 to B4 is allocated to six different spots chosen from the 24. This allocation is carried out in such a way that the distance d1 between two spots having the same allocated channel is maximized. The special channel B5 is a channel allocated to a subset of local spots 33 of the second set of spots, for example to four different spots in FIG. 3a. This allocation is carried out in such a way that the distance d2 between two spots 33 is maximized. A channel C1 in the polarization state P2, orthogonal to the polarization state P1 of the channels B1 to B5, is allocated to the spot covering the metropolitan coverage area 21, and a channel TTC is allocated to the transmission of the telemetry and command signals between the gateway 23 and the satellite 10.

The number and position of the local spots 33 of the second set of spots are activated or put into operation in a temporary manner by reconfiguration of the payload of the satellite 10 and of the multi-beam antenna system 61. The reconfiguration of the payload is commanded by the gateway 23 by means of the remote commands carried by the radio signals of the channel TTC.

Thus the global coverage area 30 is covered by the first set of spots 32 operating in one of the frequency sub-bands, corresponding, for example, to the N channels B1 to B4, these frequency sub-bands being re-used for different spots 32 spaced apart from each other. Each theatre of operation coverage area 31a, 31b, 31c is covered by one or more spots, chosen from the first set of spots 32 operating in one of the frequency sub-bands corresponding to the N channels B1 to B4, some of these spots being capable of being superimposed on a local spot 33 of the second set of spots 33 operating in the frequency sub-band corresponding to the special channel B5, and being capable of having an increased capacity. In the example of FIG. 3c, the regional spot 31c is covered by a network of eight spots, the eight spots being composed of seven spots 32, belonging to the first set of spots, and a local spot 33, with increased capacity, belonging to the second set of spots. In the example of FIG. 3d, the theatre spot 31a is covered by a network of three spots 32 belonging to the first set of spots. The capacity in an operational theatre coverage area is increased by activating the local spot 33 of the second set of spots which provides the best cover of the theatre coverage area. In the example of FIG. 3c, a local spot 33 of the second set of spots covers a peripheral area of the regional theatre coverage area 31c, to increase the capacity there.

Figure 4A:
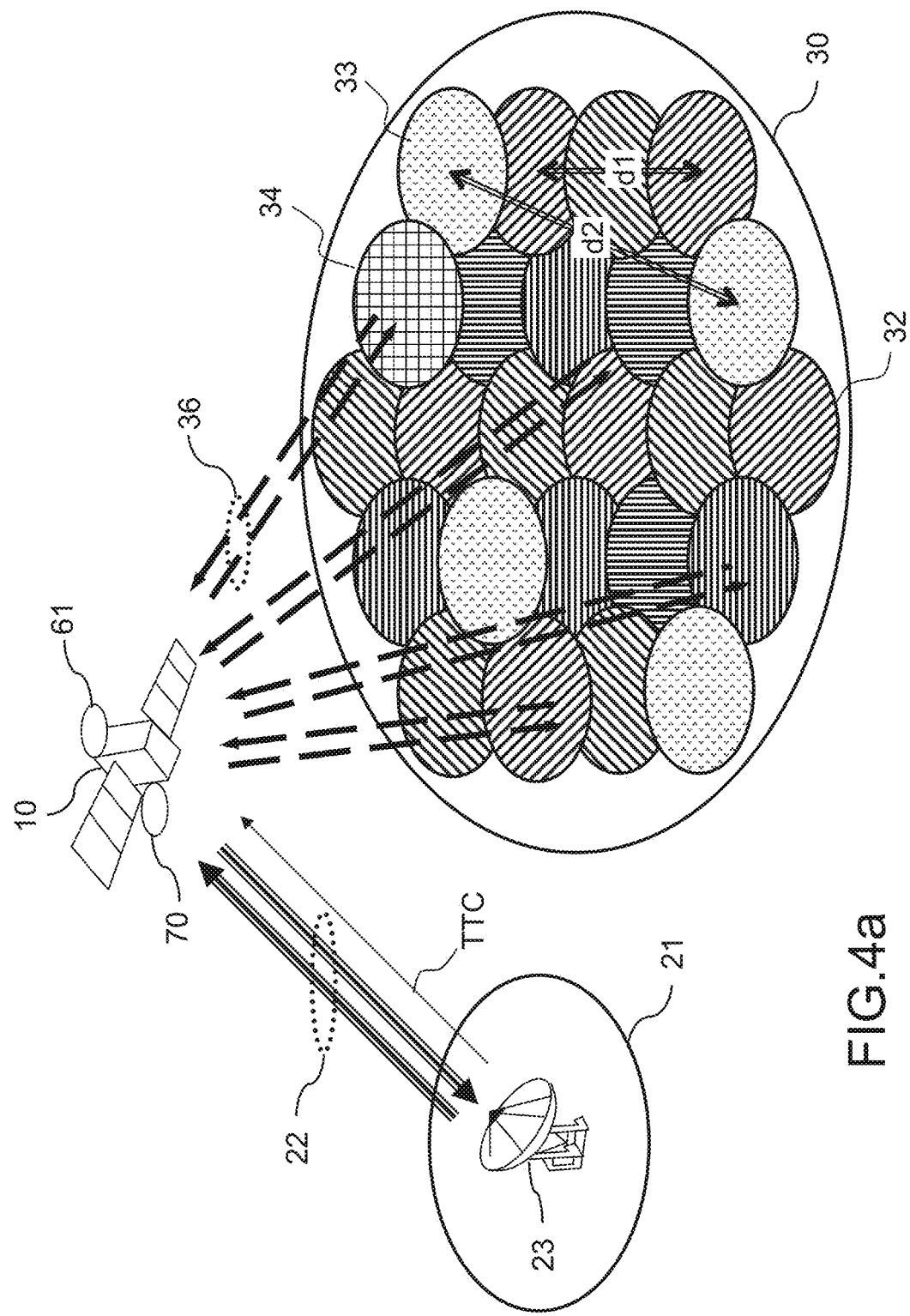
FIG. 4a shows a diagram of an example of a satellite telecommunications system with multi-beam global coverage and with frequency re-use in the case where six different colours are used, according to the invention.

Clearly, the total number of channels may be other than five, and the number of channels with increased capacity may clearly be greater than one. Thus, the second example of a frequency plan shown in FIG. 4b includes six different channels, of which two specific channels B5 and B6 have increased capacity in the polarization state P1, the channel B6 being allocated to a third set of spots as shown in the system of FIG. 4a. In this case, the global coverage area 30 is covered by three sets of spots, the first and the second sets of spots consisting of the spots 32 and the local spots 33, the third set of spots consisting of local spots 34, irregularly distributed in the global coverage area 30, and superimposed geographically on spots 32 of the first set of spots. The local spots 34 of the third set of spots have a third allocated frequency band corresponding to the additional special channel B6, which has an increased frequency capacity, greater than the frequency capacity of the channels B1 to B4 of the spots 32 of the first set of spots. The additional special channel B6 allocated to the local spots 34 of the third set of spots is different from the channels B1 to B4 allocated to the spots 32 of the first set of spots and from the special channel B5 allocated to the local spots 33 of the second set of local spots.

Figure 4B:
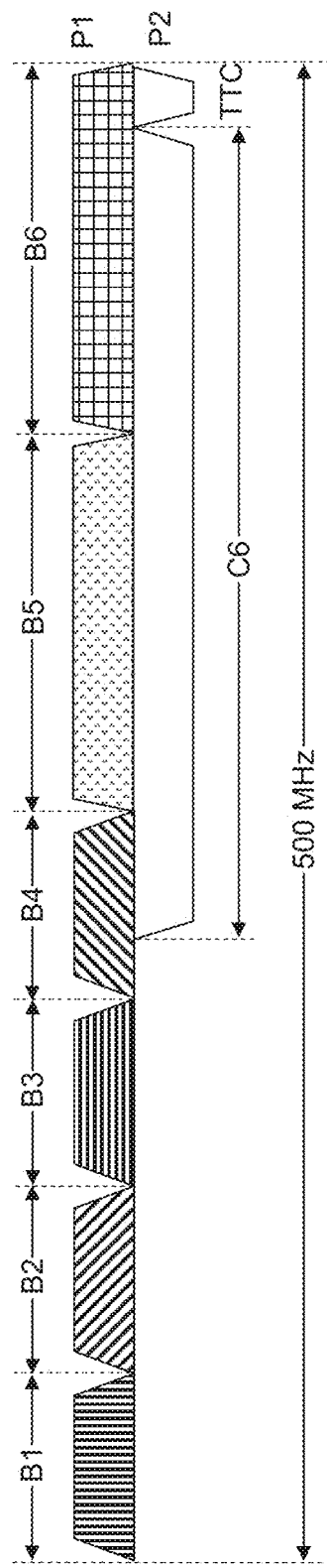
FIG. 4b shows a diagram of an example of allocation of frequency sub-bands to the multiple beams generated by the system of FIG. 4a, according to the invention.

In all the examples shown in FIGS. 3b and 4b, a frequency channel C1, operating in the X band in a second polarization state P2 orthogonal to the polarization state P1 of the channels B1 to B6, is allocated to the gateway 23. However, it is also possible to allocate a frequency channel in a different frequency band, such as the Ka or Q band, to the gateway 23.

Figure 5:
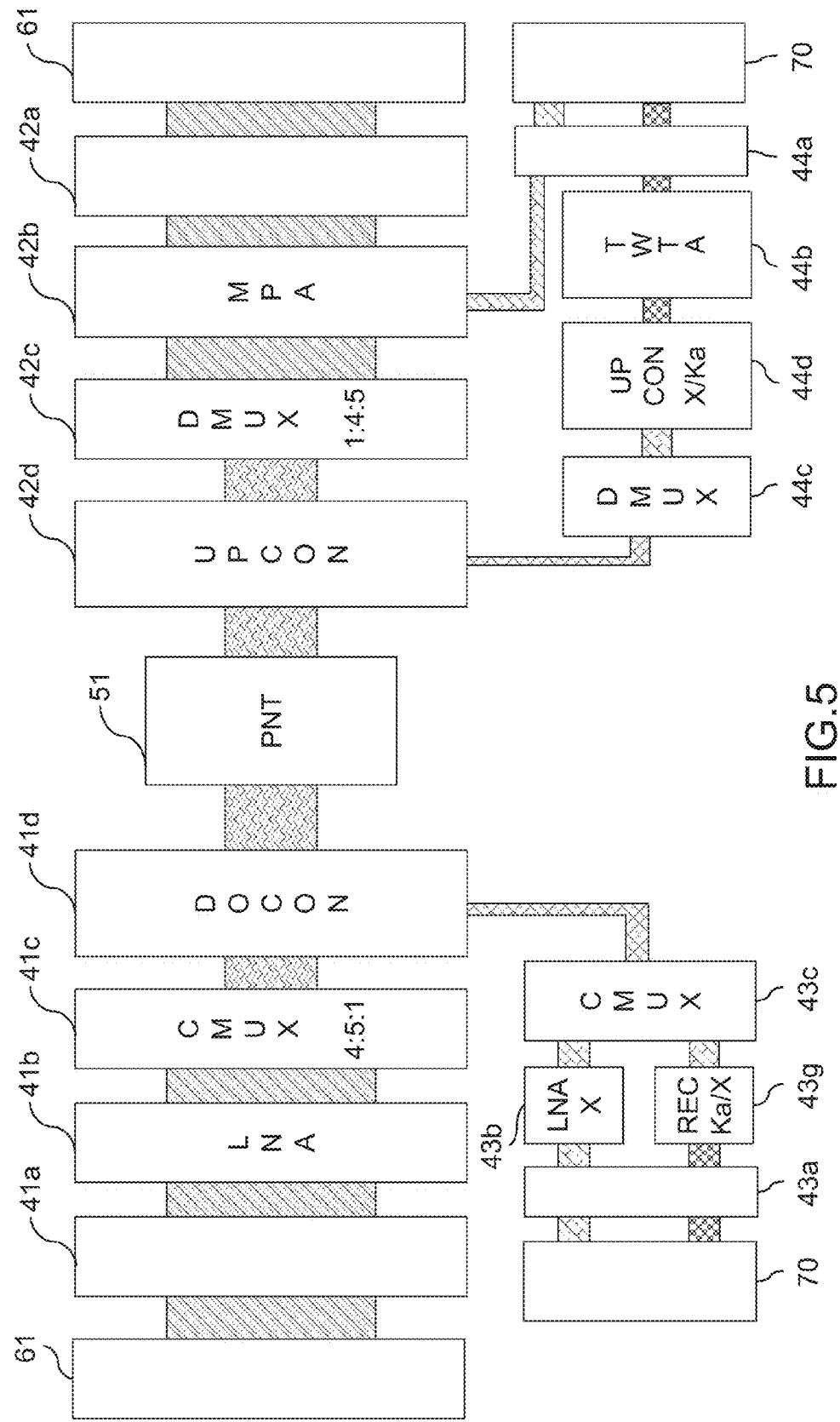
FIG. 5 shows a schematic diagram of an example of an architecture of the payload of the satellite according to a first embodiment of the invention.

FIG. 5 shows a schematic diagram of an example of a general architecture of the payload of the satellite according to a first embodiment of the invention. The payload of the satellite includes a first multi-beam transmission and reception antenna system 61 which processes the first and second set of beams 32, 33, a set of radio signal reception circuits connected for reception to the multi-beam antenna system 61, a digital transparent processor PNT 51 connected for reception to the set of reception circuits, and a set of radio signal transmission circuits connected for reception to the digital transparent processor 51 and for transmission to the multi-beam antenna system 61.

The first multi-beam transmission and reception antenna system 61 is intended to process at least two sets of beams 32, 33 in transmission and in reception. The antenna system 61 may, for example, be composed of a deployable reflector antenna of the SFPB (single feed per beam) type, with optimized inter-beam isolation.

The set of reception circuits includes filters 41a, low-noise amplifiers LNA 41b, frequency multiplexers CMUX 41c and frequency converters DOCON 41d, which are used, respectively, for the filtering, reception, channel multiplexing and frequency reduction of the radio signals received from the gateway 23.

The set of transmission circuits includes frequency converters UPCON 42d, demultiplexers DMUX 42c, power amplifiers MPA 42b and filters 42a, which are used, respectively, for the frequency raising, channel demultiplexing, multiport amplification and filtering of the radio signals received from the user terminals 35.

The payload of the satellite further includes a second transmission and reception antenna system 70 providing links between the satellite and the gateway 23, the satellite transmitting signals from the gateway 23 towards user terminals 35 via the PNT 51. In reception, the second antenna system 70 is connected to a circuit for receiving radio signals from the gateway 23, including filters 43a connected to low-noise amplifiers 43b to amplify signals in the X band, and to Ka/X receivers REC 43g for transposing any signals in the Ka band to the X band, multiplexers CMUX 43c which combine all the signals received and transmit them to an input of the frequency converter DOCON 41d and then to the input of the PNT 51. In transmission, the second antenna system 70 is connected to a circuit for transmitting signals towards the gateway 23, which is connected to an output of the PNT 51 via the frequency converter UPCON 42d for signals to be transmitted in the Ka band or via the multiport power amplifier MPA 42b for signals to be transmitted in the X band. The circuit for transmitting signals towards the gateway 23 includes demultiplexers DMUX 44c which separate the signals received from the frequency converter UPCON 42d, frequency converters 44d which convert the signals from the X band to the Ka band, power amplifiers TWTA 44b, and filters 44a connected to the antenna system 70. The signals received from the multiport power amplifier MPA 42b are filtered in the filters 44a before being transmitted by the antenna system 70.

The digital transparent processor PNT 51 filters and routes the radio signals. Thus the digital transparent processor PNT 51 is intended to manage, on the one hand, the intra-spot and inter-spot mesh traffic between user terminals 35 located in the same spot 33, 34 or in two different spots, and, on the other hand, the mesh traffic between the terminals 35 located in the global coverage area 30 and the gateway located in the metropolitan coverage area 21. The routed radio signals may, if necessary, be protected from jamming, for example by means of a frequency hopping spread spectrum technique.

The frequency multiplexing of the channels B1, B2, B3, B4, B5 by the multiplexers CMUX 41c at the input of the PNT 51 and by the demultiplexers DMUX 42c at the output of the PNT 51 makes it possible to process and route the whole of the allocated frequency band, for example 500 MHz in the X band, at each input port 54 and output port 55 of the PNT 51. Thus, if four different channels B1 to B4 are allocated to the spots 32, an input or output port of the PNT 51 processes and routes the traffic of at least four beams. The advantage is that the number of active ports of the PNT 51 and the number of frequency reducing converters DOCON 41d and frequency raising converters UPCON 42d are reduced, typically by a factor of 4.

The multiport amplification with a plurality of beams, for example eight beams, can advantageously use multiport amplifiers MPA 42b which enable the radio-frequency capacity to be shared and exchanged between the radio signals circulating in these beams. The multiport power amplifiers MPA provide combined multiport amplification of the radio signals intended for user terminals 35 located in a plurality of different spots 32, 33, 34. For example, a multiport amplifier MPA having eight input ports and eight output ports can amplify the signals contained in eight different spots.

The second set of spots 33, and the third set if present, are superimposed on the spots 32 of the first set, and can be reconfigured on request by command signal in terms of their number and position. By means of this temporary superimposition, the capacity offered by the satellite for the geographical area covered by the two spots 32, 33 can be increased locally by cumulating the bandwidths of the two channels allocated to the two corresponding spots.

Each of the low-noise amplifiers LNA 41b can advantageously be equipped with a power limiter to protect the reception circuits from any jamming devices.

In a preferred embodiment of the invention, the local spots 33 of the second set of spots are activated by the channel multiplexers CMUX 41c for the reception spots and by the channel demultiplexers DMUX 42c for the transmission spots.

Figure 6B:
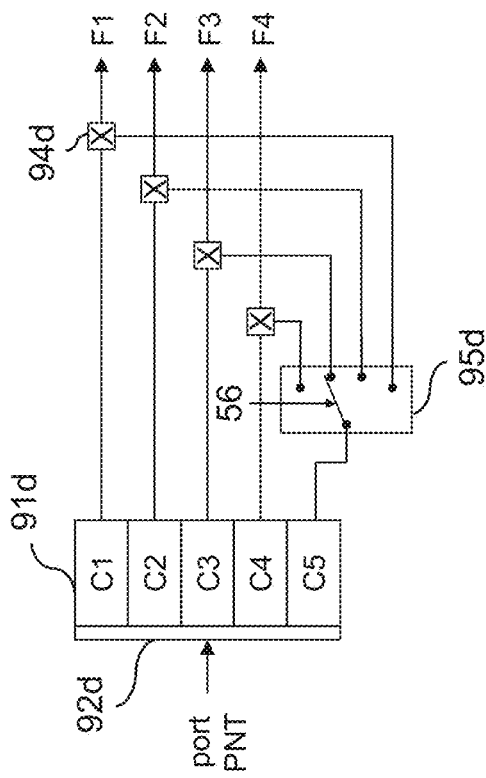
FIGS. 6a and 6b show an example of the electrical architecture of the channel multiplexers CMUX and the channel demultiplexers DMUX which can be used in the payload shown in FIG. 5, in the case where five different colours are used, according to the invention.
Figure 6A:
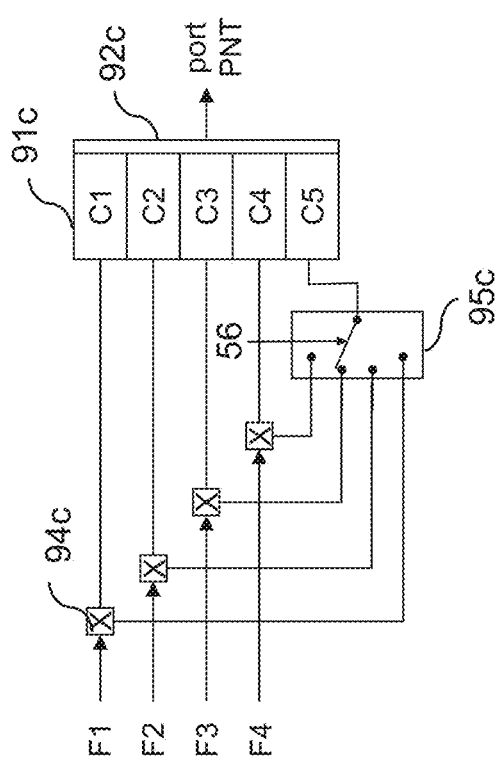

FIG. 6a shows an example of the electrical architecture of the channel multiplexers CMUX which can be used in the payload shown in FIG. 5, and FIG. 6b shows the electrical architecture of the corresponding channel demultiplexers DMUX. Each channel multiplexer CMUX [4:5:1] 41c has four inputs to which four different beams F1 to F4, respectively, are linked, four couplers 94c, a switch 95c with four different settings having four inputs and an output connected to channel B5, five filters 91c operating in channels B1 to B5 respectively, and a manifold 92c combining the outputs of the five filters into a single output connected to an input port of the PNT 51. Each coupler 94c has an input, to which one of the four beams F1 to F4 is linked, a first output connected to one of the four inputs of the switch 95c, and a second output connected to one of the four channels B1 to B4. The output of the switch 95c is connected to one of the four inputs of the switch 95c, according to the chosen setting. In FIG. 6a, the output of the switch 95c is connected to the second input of the switch, which is connected to the output of the third coupler to which the beam F3 is linked, whereby the channel B5 is connected to the beam F3 in addition to the channel B3, and the spot corresponding to the beam F3 therefore has an increased frequency capacity corresponding to the cumulated frequency capacities of channels B3 and B5. The multiplexer CMUX [4:5:1] 41c can be used to add, for one of the beams linked to one of its four inputs, the channel Bi, where Bi is one of channels B1 to B4, to the channel B5, and can thus be used to obtain a spot 33 with increased capacity locally.

The channel demultiplexers DMUX [1:5:4] 42c shown in FIG. 6b have a structure which is a mirror image of the structure of the channel multiplexers CMUX [4:5:1] shown in FIG. 6a. They each have a single input connected to an output port of the PNT 51, a manifold 92d connected to five different filters 91d operating in the frequency bands B1 to B5 respectively, four couplers 94d and a switch 95d with four different settings, having an input connected to the channel B5 and four outputs. Each coupler 94d has a first input, to which one of the four channels B1 to B4 is linked, a second input connected to one of the four outputs of the switch 95d, and an output delivering four beams F1 to F4. Depending on the setting of the switch, the input of the switch connected to the channel B5 is connected to one of its four outputs and is linked to the second input of one of the corresponding four couplers. In FIG. 6b, the input of the switch 95d is connected to the second output of the switch, which is itself connected to the third coupler which delivers the beam F3, whereby the channel B5 is linked to the beam F3 in addition to the channel B3. Depending on the setting of the switches 95d, each channel demultiplexer (DMUX [1:5:4]) can therefore add the channel B5 to the channel Bi, where Bi is one of the four channels B1, B2, B3, B4, at one of the four outputs of beams F1 to F4. The setting of the switches 95c, 95d is controlled by a command signal 56 sent by the gateway 23.

Thus, in the case of the examples of electrical architecture of the CMUX and DMUX shown in FIGS. 6a and 6b, a local spot 33 of the second set of spots can be activated among four spots of the first set 32. Each new definition of the spots in terms of number and position is constrained so as to make the best use of the frequency sub-band corresponding to the special channel B5, and this definition therefore takes place in such a way that the distance d2 between two spots 33 is maximized. The geographical area covered simultaneously by two spots 32, 33 of the first and second sets of spots benefits from increased capacity. In this way the capacity offered in geographical areas where the user terminals 35 are concentrated can be increased temporarily on request. In the case of the examples of electrical architecture of the multiplexers CMUX and demultiplexers DMUX shown in FIGS. 6a and 6b, the bandwidth capacity is the cumulative bandwidth of the two channels B1 and B5, where Bi is one of the four channels B1, B2, B3, B4.

This embodiment makes it possible to cover theatre coverage areas 31a, 31b and 31c where there is a higher concentration of terminals with one or more spots with increased capacity if necessary.

Figure 7:
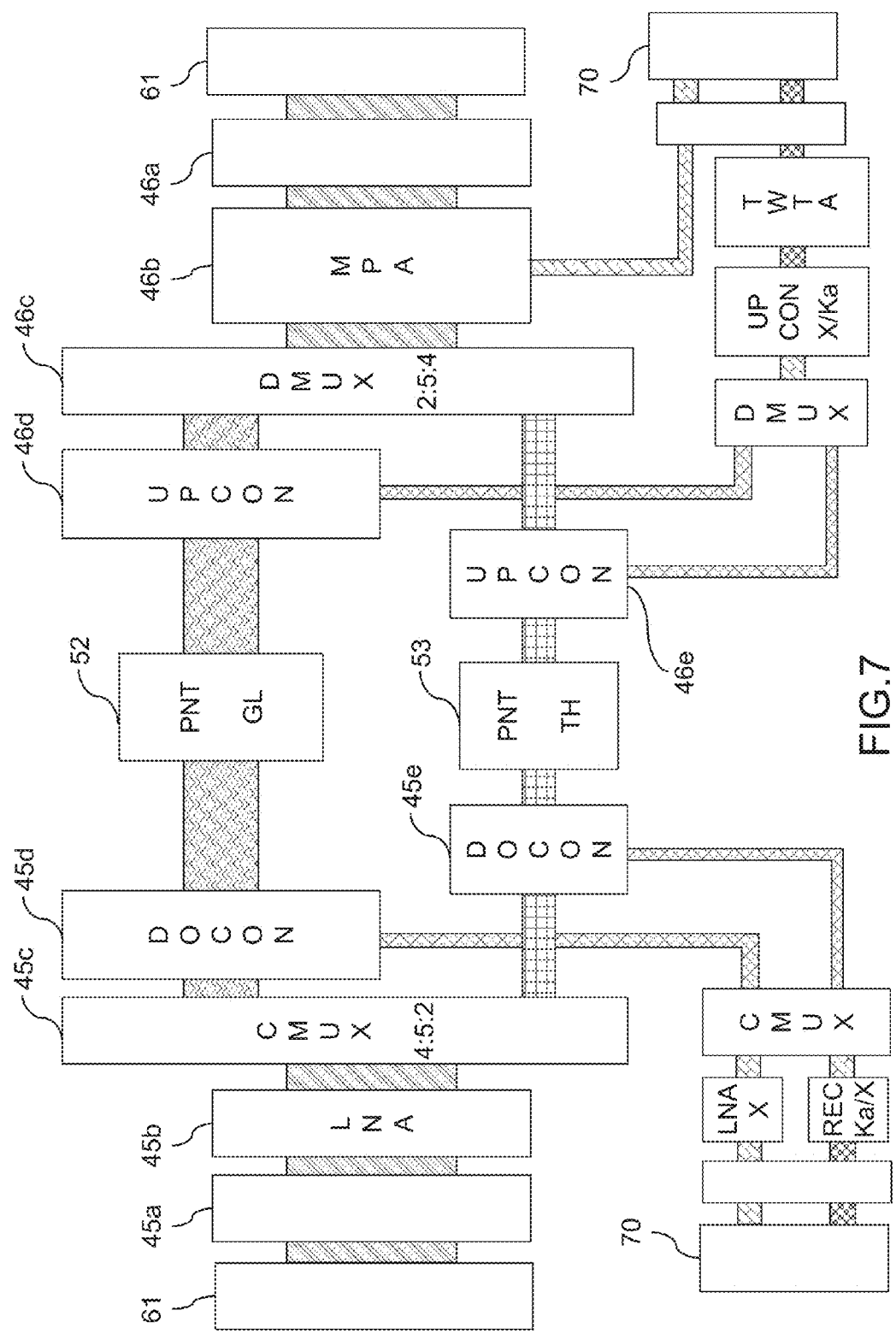
FIG. 7 shows a schematic diagram of an example of architecture of the payload of the satellite according to a second embodiment of the invention.

FIG. 7 shows a schematic diagram of the general architecture of the payload of a satellite according to a second embodiment of the invention. The payload includes a first multi-beam antenna system 61 which processes, in transmission and in reception, at least two sets of beams corresponding, on the ground, to the two sets of spots 32, 33, connected for reception to a set of circuits for receiving radio signals from the user terminals 35, the reception circuits of the first set of beams being connected to the input of a first digital transparent processor PNT/GL 52 and the reception circuits of the second set of beams being connected to the input of a second digital transparent processor PNT/TH 53, the outputs of the first digital transparent processor PNT/GL 52 and the second digital transparent processor PNT/TH 53 being connected for transmission to a set of transmission circuits connected for transmission to the first multi-beam antenna system 61.

The set of reception circuits includes filters 45a, low-noise amplifiers 45b, multiplexers 45c and frequency converters 45d, 45e, which are used, respectively, for the filtering, reception, channel multiplexing and frequency changing of the radio signals received by the multi-beam antenna system 61.

The set of transmission circuits includes frequency converters 46d, 46e, demultiplexers 46c, multiport power amplifiers MPA 46b, and filters 46a, which are used, respectively, for the frequency changing, channel demultiplexing, multiport amplification and filtering of the radio signals routed by the first digital transparent processor PNT/GL 52 and by the second digital transparent processor PNT/TH 53.

The first digital transparent processor PNT/GL 52 filters and routes the radio signals received and transmitted in the spots 32 corresponding to the first set of beams, and the second digital transparent processor PNT/TH 53 filters and routes the radio signals received and transmitted in the local spots 33 corresponding to the second set of beams.

The payload of the satellite further includes a second transmission and reception antenna system 70 providing links between the satellite 10 and the gateway 23, the satellite 10 transmitting signals from the gateway 23 towards user terminals 35 via a set of circuits for receiving the radio signals from the gateway 23, the PNT/GL 52 and the PNT/TH 53, and a set of circuits for transmitting the signals routed by the PNT/GL 52 and the PNT/TH 53. The architecture of the circuits for receiving the radio signals from the gateway 23 and the circuits for transmitting the signals routed by the PNT/GL 52 and the PNT/TH 53 is identical to the corresponding architecture described for the first embodiment of the invention with reference to FIG. 5.

Figures 8A, 8B:
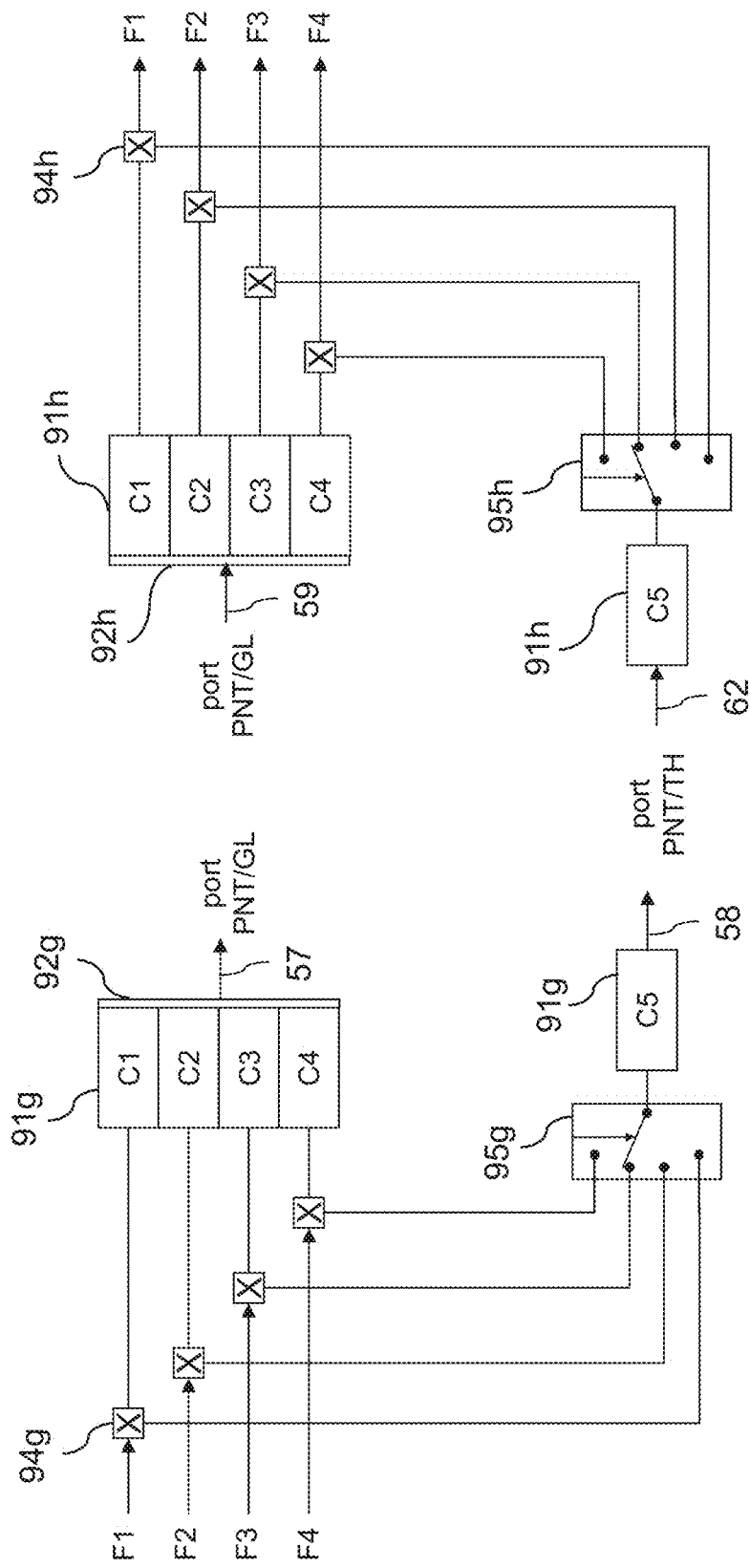
FIGS. 8a and 8b show an example of the electrical architecture of the channel multiplexers CMUX and the channel demultiplexers DMUX which can be used in the payload shown in FIG. 7, in the case where five different colours are used, according to the invention.

FIG. 8a shows an example of the electrical architecture of the channel multiplexers CMUX which can be used in the payload shown in FIG. 7, and FIG. 8b shows the electrical architecture of the corresponding channel demultiplexers DMUX. Each multiplexer CMUX [4:5:2] 45c and each demultiplexer DMUX [2:5:4] 46c has the same components as the corresponding multiplexers and demultiplexers shown in FIGS. 6a and 6b. The only difference is that each multiplexer CMUX [4:5:2] 45c has two outputs, connected, respectively, to an input port 57 of the PNT/GL 52 and to an input port 58 of the PNT/TH 53, and each demultiplexer DMUX [2:5:4] 46c has two inputs, connected, respectively, to an output port 59 of the PNT/GL 52 and to an output port 62 of the PNT/TH 53. The first output of the multiplexer 45c connected to an input port 57 of the PNT/GL 52 corresponds to the output of a manifold 92g connected to four filters 91g corresponding to the four channels B1 to B4 allocated to the first set of spots 32, and the second output of the multiplexer 45c connected to an input port 58 of the PNT/TH 53 corresponds to the output of a filter 91g corresponding to the special channel B5 with increased capacity allocated to the second set of spots 33. Similarly, in a mirror-image arrangement, the first input of the demultiplexer 46c connected to an output port 59 of the PNT/GL 52 corresponds to the input of a manifold 92h connected to four filters 91h corresponding to the four channels B1 to B4 allocated to the first set of spots 32, and the second input of the multiplexer 45c connected to an input port 62 of the PNT/TH corresponds to the input of a filter 91h corresponding to the special channel B5 with increased capacity allocated to the second set of spots 33. The multiplexer 45c further includes four couplers 94g and a switch 95g with four settings, and enables the special channel B5, present at one of the four inputs of the beams F1 to F4, to be selected and routed towards the second output connected to the input port 58 of the second PNT/TH 53. Similarly, the demultiplexer 46c further includes four couplers 94h and a switch 95h with four settings, and enables the special channel B5, present at the second input connected to the output port 62 of the second PNT/TH 53, to be routed towards one of the four outputs for the beams F1 to F4.

Although the invention has been described with reference to particular embodiments, it is obviously not restricted in any way by this, and it comprises all the technical equivalents of the means described, and of their combinations where these fall within the scope of the invention.

The invention claimed is:

1. A satellite telecommunications system for providing star traffic and mesh traffic, including:
    a satellite, at least one terrestrial gateway located in a metropolitan coverage area,
    a global coverage area and a plurality of fixed or mobile user terminals distributed in the global coverage area,
    a bidirectional radio link between the gateway and the satellite, bidirectional radio links between the satellite and the user terminals, and
    a telemetry and command link between the gateway and the satellite,
    wherein the global coverage area is covered by a first set of spots of identical size, which partially overlap and which form a regular cellular network, and by at least a second set of local spots, irregularly distributed in the global coverage area and superimposed geographically on spots of the first set of spots,
    wherein the spots of the first set have first allocated frequency bands corresponding to N different channels having the same frequency capacity, where N is an integer greater than 1, said first frequency bands being reused for different spots of the first set spaced apart from each other, while the local spots of the second set have a second allocated frequency band corresponding to a special channel having an increased frequency capacity, greater than the frequency capacity of the channels of the spots of the first set, the special channel of the second set of spots being different from the channels of the first set of spots, and
    wherein in the global coverage area where a spot of the first set and a spot the second set of local spots are superimposed, the frequency capacity is increased locally by cumulating the bandwidths of two channels in the N different channels allocated to the two superimposed spots of said first set and said second set.

2. The satellite telecommunications system according to claim 1, wherein the global coverage area is covered by a third set of local spots, irregularly distributed in the global coverage area, and geographically superimposed on spots of the first set, the local spots of the third set having a third allocated frequency band corresponding to a special additional channel having an increased frequency capacity, greater than the frequency capacity of the channels of the spots of the first set, the special additional channel of the third set of local spots being different from the channels allocated to the spots of the first set and from the special channel allocated to the spots of the second set of local spots.

3. The satellite telecommunications system according to claim 1, including a first multi-beam transmitting and receiving antenna system which, on the one hand, illuminates the whole of the global coverage area and forms, on the ground, the regular cellular network of spots of the first set of spots, and which, on the other hand, locally illuminates geographical areas of the global coverage where user terminals are concentrated, by the irregularly distributed local spots of the second set of spots, the geographical areas illuminated by the local spots of the second set of spots being selected and activated by the gateway.

4. The satellite telecommunications system according to claim 1, further comprising at least one digital transparent processor to filter and route the intra-spot and inter-spot mesh traffic between user terminals located in the same spot or in two different spots and the star traffic between terminals located in the global coverage area and the gateway located in the metropolitan coverage area, the digital transparent processor including input ports connected to the first multi-beam transmitting and receiving antenna system by a set of reception circuits and output ports connected to the first multi-beam transmitting and receiving antenna system by a set of transmission circuits, each reception circuit including a frequency multiplexer for the frequency multiplexing and selection of different channels appearing at the same input of the digital transparent processor and each transmission circuit including a frequency demultiplexer for the demultiplexing and selection of different channels delivered from the same output of the digital transparent processor.

5. The satellite telecommunications system according to claim 4, wherein the set of reception circuits further includes low-noise amplifiers each equipped with a power limiter.

6. The satellite telecommunications system according to claim 4, wherein the set of transmission circuits further includes multiport power amplifiers for the combined multiport amplification of the radio signals intended for the user terminals located in a plurality of different spots.

7. The satellite telecommunications system according to claim 4, wherein the frequency multiplexer of each reception circuit includes N couplers and a switch having four different settings, the setting of each switch being controlled by the gateway, each switch selecting a different channel chosen from among all the channels allocated to the spots of the first set of spots and from among all combinations of channels which couple the special channel allocated to the second set of spots to one of said channels allocated to the spots of the first set, the channel selected by each switch depending on the setting of the corresponding switch.

8. The satellite telecommunications system according to claim 7, including at least a first digital transparent processor to filter and route the traffic corresponding to the spots of the first set of spots and at least a second processor to filter and route the traffic corresponding to the local spots of the second set of spots.

9. The satellite telecommunications system according to claim 6, including at least a first digital transparent processor to filter and route the traffic corresponding to the spots of the first set of spots and at least a second processor to filter and route the traffic corresponding to the local spots of the second set of spots.

10. The satellite telecommunications system according to claim 5, including at least a first digital transparent processor to filter and route the traffic corresponding to the spots of the first set of spots and at least a second processor to filter and route the traffic corresponding to the local spots of the second set of spots.

11. The satellite telecommunications system according to claim 4, including at least a first digital transparent processor to filter and route the traffic corresponding to the spots of the first set of spots and at least a second processor to filter and route the traffic corresponding to the local spots of the second set of spots.

* * * * *